United States Patent [19]

Adickes

[11] 4,387,915

[45] Jun. 14, 1983

[54] EXHAUST SYSTEM PIPE AND EXHAUST SYSTEM WITH SUCH A PIPE

[75] Inventor: Henning Adickes, Heidelberg, Fed. Rep. of Germany

[73] Assignee: Deere & Company, Moline, Ill.

[21] Appl. No.: 383,677

[22] Filed: Jun. 1, 1982

Related U.S. Application Data

[63] Continuation of Ser. No. 164,364, Jun. 30, 1980, abandoned.

[30] Foreign Application Priority Data

Jul. 26, 1979 [GB] United Kingdom ............... 7926043

[51] Int. Cl.³ .......................... F16L 9/22; F16L 27/12
[52] U.S. Cl. ..................................... 285/330; 285/31; 285/339; 138/109; 138/113; 138/148; 138/178; 138/DIG. 6
[58] Field of Search ............... 138/44, 109, 113, 114, 138/148, 178, DIG. 6; 60/320, 322, 324; 180/309; 277/207 A; 285/31, 330, 339

[56] References Cited

U.S. PATENT DOCUMENTS

| | | | |
|---|---|---|---|
| 1,153,002 | 9/1915 | Wright | 277/207 A |
| 1,660,714 | 2/1928 | Lincoln | 138/148 |
| 1,746,132 | 2/1930 | Stokes | 138/109 X |
| 3,581,842 | 6/1971 | Hall | 285/31 X |
| 3,593,750 | 7/1971 | Zautner | 138/109 |
| 4,142,366 | 3/1979 | Tanshashi et al. | 138/148 |

FOREIGN PATENT DOCUMENTS 1364765  5/1964  France ............................. 138/113

Primary Examiner—James E. Bryant, III

[57] ABSTRACT

An end pipe (18) of a tractor exhaust system is adapted for connection to an upright outlet pipe (12) from an exhaust muffler (10) so that when the end pipe (18) or muffler (10) is to be replaced, the pipes (18, 12) can easily be separated. This is achieved by ensuring that only very small areas of the pipes (18, 12) contact each other.

The end pipe (18) has an insert (20) therein which has a lower converging frusto-conical portion (24) which acts as a seating for a converging end (14) of the outlet pipe (12). A ring (28) with a convex inner face (in cross-section) is also provided in the end pipe (18) near its lower end. This ring (28) contacts the outer surface of the outlet pipe (12). In this way, the outlet pipe (12) is maintained out of contact with the end pipe (18), except at the ring (28), and the converging end (14) of the outlet pipe.

10 Claims, 1 Drawing Figure

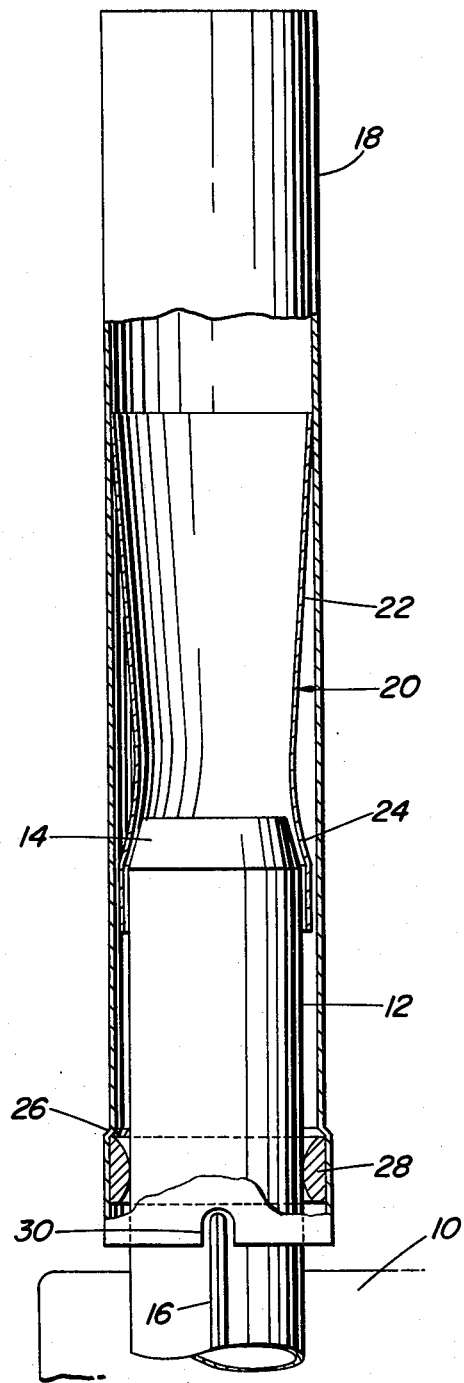

EXHAUST SYSTEM PIPE AND EXHAUST SYSTEM WITH SUCH A PIPE

This is a continuation of application Ser. No. 164,364, filed June 30, 1980, now abandoned.

BACKGROUND OF THE INVENTION

This invention relates to an exhaust system pipe, particularly for a tractor, for connection to a second pipe by receiving an end portion of the second pipe therein.

Exhaust system pipes of tractors are usually connected simply by fitting the end of one pipe into an end of the other pipe, the overlapping end portions of the pipes contacting each other. In damp and hot conditions, met within service, the pipes tend to corrode and to adhere fairly strongly, one to the other, so that when one of the pipes is to be replaced, it is often difficult to free them.

SUMMARY OF THE INVENTION

The present invention provides a design of pipe in which the contact area between two connected pipes is greatly reduced so that they can be freed more easily from one another for replacement.

According to the present invention, an exhaust system pipe for connection to a second pipe by receiving an end portion of the second pipe therein has an insert therein with a converging portion for providing a seat for a converging end of the said end portion and an inward protrusion spaced from the insert for contacting the outer surface of the second pipe to maintain the second pipe out of contact with the inner surface of the first pipe, except at the protrusion and the insert.

The invention includes an exhaust system, including a said exhaust system pipe connected to a said second pipe.

BRIEF DESCRIPTION OF THE DRAWING

The FIGURE is a diagrammatic longitudinal cross-sectional view through a portion of an exhaust pipe system constructed according to the applicant's invention.

DETAILED DESCRIPTION OF THE INVENTION

A muffler 10 of the exhaust system is located below the hood (or bonnet) of a tractor which is not shown in the drawing. The muffler 10 has a vertical outlet pipe 12 which projects through an aperture in the hood, and in the present case, the upper end portion 14 of the pipe 12 is frusto-conical in shape. The muffler 10 is of standard construction, except that it includes a pair of upright external flanges, of which one only is shown and designated 16. Each flange 16 consists of two flange portions, which in the standard construction would be within the muffler welded together during its fabrication.

A vertical end pipe 18 is provided which includes an insert 20 which is welded at least at its upper end to the inner surface of the pipe 18 and which consists of an upper frusto-conical portion 22 converging toward outlet pipe 12 and a lower frusto-conical portion 24 converging away from outlet pipe 12 but with a different inclination to the upper end portion 14 of the outlet pipe 12.

The end pipe 18 has a constant diameter throughout its length except that there is a slight increase in diameter due to the provision of a shoulder 26 at the lower end portion of the pipe. Seating against this shoulder 26 is a steel ring 28 of which the radially outer surface follows the contour of a cylinder and the radially inner surface is convex in cross-section. The ring 28 is located, again, by welding.

Finally, two diametrically opposite blind slots, of which one only, 30, is shown, extend parallel to the axis of the pipe 18 from the pipe's bottom edge. These slots are in alignment to receive corresponding flanges 16.

To connect the end pipe 18 to the muffler outlet pipe 12, all that is necessary is that the lower end of the end pipe 18 is fitted over the outlet pipe 12 with the slots 30 aligned with the flanges 16, and then pushed downwardly until the flanges 16 are received by the slots 30 and the upper end portion 14 of the outlet pipe 12 comes into abutment with the lower frusto-conical portion 24 of the insert 20. The exhaust system is then ready for use.

It will be appreciated that the areas of contact between the insert 20 and the outlet pipe 12 and between the ring 28 and the pipe 12 are very small. During service, the exhaust system is, as mentioned above, subject to damp and hot conditions which encourage the formation of rust at the contacting surfaces and which tend to make the surfaces adhere one to the other. However, since the areas of contact are so small, it is normally an easy task to free the end pipe 18 from the outlet pipe for replacement when this becomes necessary. If the end pipe were permitted to turn in relation to the outlet pipe 12, wear could result and a weather cap (not shown) could become disoriented. The weather cap is usually mounted at the top end of the end pipe 18. However turning is prevented by the seating of the flanges 16 in the slots 30.

Furthermore, the downwardly converging portion 22 of the insert 20 assists exhaust gas flow in that its shape causes deceleration of the upward flow of exhaust gas, reducing back pressure and gas tightness.

I claim:
1. An exhaust pipe assembly comprising:
   a first pipe;
   a second pipe receiving the first pipe and having an inner diameter larger than the outer diameter of the first pipe;
   a separate tubular member disposed within and attached to the second pipe, the tubular member having an abutment surface for engaging a corresponding abutment surface of the first pipe, the first pipe abutting the abutment surface of the tubular member; and
   a spacer member fixed to the second pipe in a spaced apart relationship to the tubular member and engageable with the first pipe, the spacer member and the tubular member cooperating with the pipes to prevent contact therebetween.
2. The exhaust pipe assembly of claim 1 wherein:
   one of the pipes includes a slot for receiving a flange projecting from the other pipe, the slot and flange cooperating to prevent relative rotation between the two pipes.
3. The exhaust pipe assembly of claim 1 wherein:
   the tubular member includes a first frusto-conical portion diverging towards the first pipe, an inner surface of which defines the abutment surface of the tubular member.
4. The exhaust pipe assembly of claim 3 wherein:

the tubular member includes a second frusto-conical portion connected to the first frusto-conical portion and diverging away from the first pipe.

5. The exhaust pipe assembly of claim 1 wherein:
the spacer member is comprised of an annular ring with a radially convex inner surface, a portion of which is engageable with the first pipe.

6. The exhaust pipe assembly of claim 1 wherein:
the second pipe includes larger and smaller diameter portions defining an annular shoulder therebetween against which the spacer member may be seated.

7. An exhaust pipe assembly comprising:
a first pipe having a flange projecting therefrom;
a second pipe receiving the first pipe and having an inner diameter larger than the outer diameter of the first pipe and having a slot therein for receiving the flange on the first pipe;
a separate tubular member attached to an inner surface of the second pipe, comprising a first frusto-conical portion diverging towards the first pipe and defining an inner abutment surface engaging a corresponding outer abutment surface on the first pipe and comprising a second frusto-conical portion connected to the first frusto-conical portion and diverging away from the first pipe; and
an annular spacer member projecting radially from an inner surface of the second pipe and spaced apart from the tubular member, the spacer member having an inner surface engageable with the first pipe, the spacer member, the tubular member and the two pipes cooperating to prevent contact between the two pipes.

8. The exhaust pipe assembly of claim 7 wherein:
the second pipe includes a pair of diametrically opposed slots for receiving corresponding flanges projecting from the first pipe, the slots and flanges cooperating to prevent relative rotation between the first and second pipes.

9. The exhaust pipe assembly of claim 7 wherein:
the second pipe includes larger and smaller diameter portions defining an annular shoulder therebetween against which the spacer member may be seated.

10. An exhaust pipe comprising:
an outer pipe;
a tubular member disposed within the outer pipe, having a first end fixed to the outer pipe and having a second end spaced apart from the first end, the second end having an inner surface defining an abutment surface thereon; and
a spacer member fixed to and within the outer pipe in a spaced-apart relationship to the tubular member, the spacer member and the abutment surface of the second end of the tubular member being adapted for receiving and engaging an exhaust outlet pipe upon which the pipe assembly may be mounted, and for preventing contact between the outer pipe and such an exhaust outlet pipe.

* * * * *